US010728778B2

(12) United States Patent
Chen et al.

(10) Patent No.: US 10,728,778 B2
(45) Date of Patent: Jul. 28, 2020

(54) INTERACTION MECHANISM BETWEEN RADIO LINK MONITORING/RADIO LINK FAILURE (RLM/RLF) AND BEAM FAILURE RECOVERY PROCEDURE

(71) Applicant: FG Innovation Company Limited, Tuen Mun (HK)

(72) Inventors: Hung-Chen Chen, Hsinchu (TW); Yu-Hsin Cheng, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/181,368

(22) Filed: Nov. 6, 2018

(65) Prior Publication Data
US 2019/0141552 A1 May 9, 2019

Related U.S. Application Data

(60) Provisional application No. 62/581,851, filed on Nov. 6, 2017.

(51) Int. Cl.
H04L 12/26 (2006.01)
H04W 24/08 (2009.01)

(52) U.S. Cl.
CPC .................. H04W 24/08 (2013.01)

(58) Field of Classification Search
CPC . H04J 3/14; H04L 43/50; H04L 43/00; H04B 17/00; H04W 24/00
See application file for complete search history.

(56) References Cited

U.S. PATENT DOCUMENTS

| 2012/0088498 | A1* | 4/2012 | Xiao | H04W 24/02 455/424 |
| 2017/0347361 | A1* | 11/2017 | Tsuboi | B66C 23/06 |
| 2019/0028174 | A1* | 1/2019 | Chakraborty | H04B 7/088 |
| 2019/0036590 | A1* | 1/2019 | Nagaraja | H04B 17/309 |
| 2019/0081689 | A1* | 3/2019 | Yu | H04W 24/04 |

* cited by examiner

Primary Examiner — Siren Wei
(74) Attorney, Agent, or Firm — ScienBiziP, P.C.

(57) ABSTRACT

A user equipment for a wireless communication is configured to interact the radio link monitoring and beam failure recovery for resolving radio link failure quickly. When the out-of-synchronization (OOS) condition is detected in PHY sublayer, a timer may start to wait to receive a beam recovery success indication. Once the beam recovery success indication is received in RRC sublayer, the RRC sublayer may determine to consecutively receive a number of in-synchronization (IS) indications. If the number of the consecutively received IS indication is larger than or equal to a threshold number by comparing, the radio link is identified as being recovered.

18 Claims, 7 Drawing Sheets

INTERACTION MECHANISM BETWEEN RADIO LINK MONITORING/RADIO LINK FAILURE (RLM/RLF) AND BEAM FAILURE RECOVERY PROCEDURE

CROSS REFERENCE TO RELATED APPLICATIONS

This application claims the benefit of and priority to U.S. Provisional Application No. 62/581,851 filed on Nov. 6, 2017 and entitled "INTERACTION MECHANISM BETWEEN RLM/RLF AND BEAM FAILURE RECOVERY PROCEDURE,".

TECHNICAL FIELD

The present disclosure generally relates to a method for radio link recovery and wireless terminal operating the method.

BACKGROUND

In long-term evolution (LTE), radio link failure (RLF) occurs when an user equipment (UE) in an RRC_connected state detects timer expiry due to downlink (DL) out-of-synchronization (out-of-sync or OOS) condition, random access procedure failure or radio link control (RLC) failure. In the case of timer expiry due to DL OOS condition, physical (PHY) sublayer sends a number of OOS indications and in-synchronization (in-sync or IS) indications to radio resource control (RRC) sublayer periodically, and RRC sublayer detects DL radio link problems when consecutive N1 of periodic OOS indications are received. Once receiving the consecutive N1 of the OOS indications from PHY sublayer, a timer T1 starts. The timer T1 will stop when receiving N2 of consecutive IS indications in RRC sublayer. If the timer T1 keep running until it expires, radio link failure will be confirmed and a timer T2 will start for initiating RRC connection re-establishment procedure if security is activated. If T2 expires due to RRC re-establishment failure, the UE would enter the RRC_idle state. If the timer T1 keep running until it expires and security is not activated, the UE would enter the RRC_idle state.

In new radio (NR), the UE is configured in communication with base stations via radio beams. The UE monitors associated reference signal for beam failure detection and the beam failure occurs when the beam failure condition is met based on the configured parameters, e.g., beamFailureInstanceMaxCount and beamFailureDetectionTimer. Beam failure recovery (BFR) can be performed to resolve the beam failure and restore the radio link so that the heavy RRC connection re-establishment can be avoided when the UE declares an RLF.

However, the RLF procedure and the BFR procedure are performed separately in different sublayers, resulting in radio link restoration time wasting and bad user experiences. Therefore, an interaction mechanism between the RLF procedure and BFR procedure is required for better system performance to reduce mismatch of the two separate procedures in different sublayers.

SUMMARY

The present application is directed to interaction mechanism between radio link monitoring/radio link failure (RLM/RLF) and beam failure recovery procedure.

In one aspect of the present application, a method for a user equipment (UE) in a wireless network is provided. The method comprises starting a first timer when an out-of-sync condition is detected; receiving a beam recovery success (BRS) indication indicating a beam recovery is successfully made; determining, in response to the BRS indication, to receive consecutively a plurality of in-sync (IS) indications; comparing the number of the consecutively received IS indications with a threshold number; and identifying whether the out-of-sync condition is resolved based on the comparing.

In one aspect of the present application, a user equipment (UE) in a wireless network is provided. The UE is configured to start a first timer when an out-of-sync condition is detected; to receive a beam recovery success (BRS) indication indicating a beam recovery is successfully made; to determine, in response to the BRS indication, to receive consecutively a plurality of in-sync (IS) indications; to compare the number of the consecutively received IS indications with a threshold number; and to identify whether the out-of-sync condition is resolved based on the comparing.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
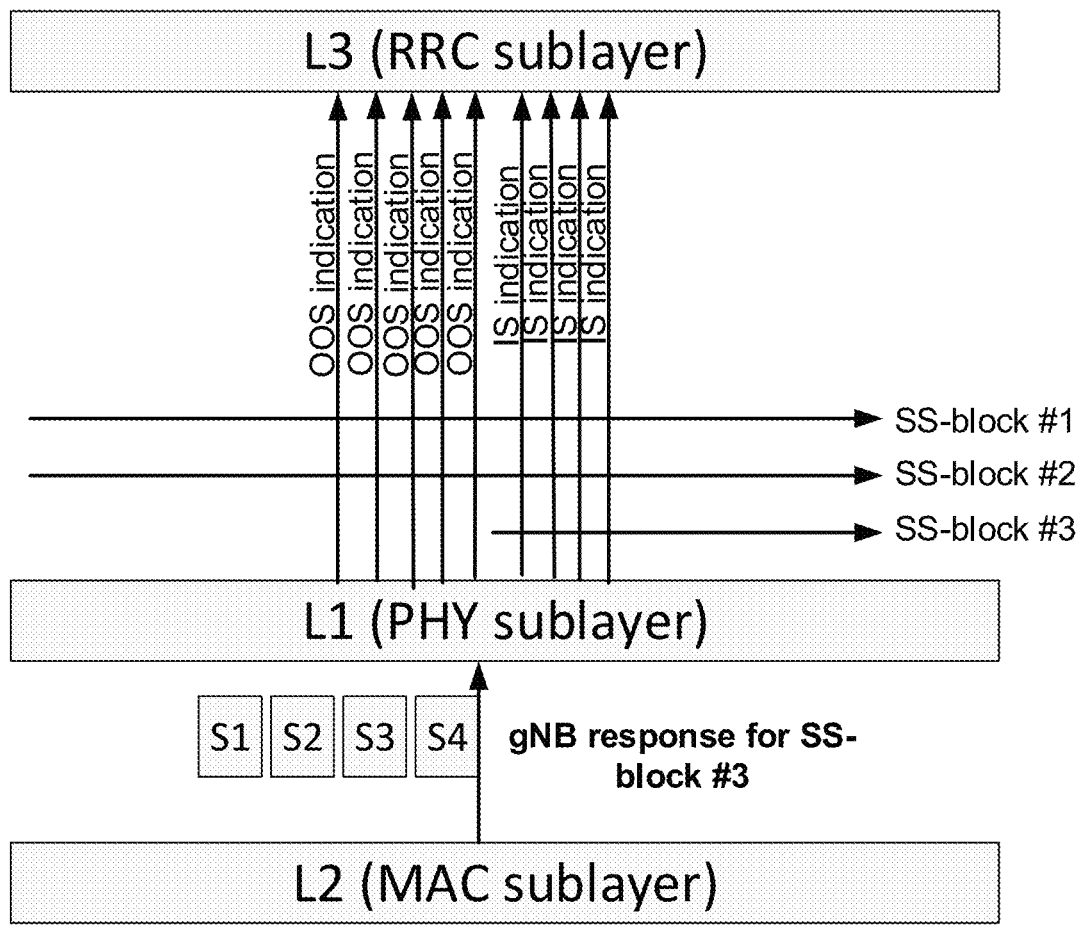
FIG. 1 is a schematic diagram illustrating a radio link monitoring procedure during radio link recovery according to one embodiment of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

It is noted that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a personal digital assistant (PDA), or a television display with wireless communication capability. The UE is configured to receive and transmit signals over an air interface to one or more cells in a radio access network.

A base station may include, but is not limited to a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G Access Network (5G-AN), and any other apparatus capable of controlling radio communication with cellular positioning technology and managing radio resources within a cell. The base station may connect to serve the one or more UEs through a radio interface to the network.

A UE in RRC_connected state determines if a radio link failure (RLF) occurs based on how many out-of-synchronization (OOS) indications and in-synchronization (IS) indications it receives. PHY sublayer of the UE sends the OOS indications and IS indications to RRC sublayer, and the RRC sublayer detects that an out-of-synchronization condition occurs after receiving consecutively a number of the OOS indications. When OOS condition is detected in the RRC sublayer, the UE may run a timer to wait for radio link recovery meanwhile a beam failure recovery (BFR) is performed in the lower sublayer. If BFR is made successfully in the lower sublayer sublayer, a beam recovery success (BRS) indication may be generated in and sent from the lower sublayer to the RRC sublayer and the timer may stop running. The lower sublayer could be medium access control (MAC) sublayer or physical (PHY) sublayer. Upon receiving the BRS indication, the RRC sublayer may determine to consecutively receive a number of the IS indications. If the number of the consecutively received IS indications is larger than or equal to a threshold number, the radio link is considered being recovered and the timer may stop running. On the other hand, if one or more OOS indications are received after receiving the BRS indication, the timer may re-start to run until it expires. Once the timer expires, the radio link failure is declared and another timer starts to run for a time period during which the UE may attempt to initiate a RRC connection re-establishment. If the timer for initiating RRC connection re-establishment expires, the UE may enter an RRC_idle state.

In one embodiment, a UE in RRC_connected state keeps monitoring radio link quality by measuring block error rate (BLER) of physical downlink control channel (PDCCH). When the radio link quality becomes bad and the measured BLER exceeds a threshold (e.g., 10%), the PHY sublayer may send periodically OOS indications to the RRC sublayer. On the contrary, when the radio link quality becomes better and the measured BLER reduces below a threshold (e.g., 2%), the PHY sublayer may send periodically IS indications to the RRC sublayer.

In one embodiment, a UE in an RRC_connected state monitors radio link quality by performing radio link monitoring (RLM) procedure that monitors indicated reference signal (RLM-RS). The indicated RLM-RS resources correspond to a specific OOS threshold and a specific IS threshold. The synchronization signal block (SS-block) and/or channel state information reference signal (CSI-RS) may be one of the RLM-RS resources. The network (NW), e.g., a gNB, may configure a set of RLM-RS resources in advance and activate a portion of RLM-RS resources for RLM procedure in a period. The activation and de-activation of the RLM resources may be configured by corresponding MAC control elements (CEs) or specific downlink control information (DCI). If the RLM-RS quality is below the specific OOS threshold, the PHY sublayer may send periodically OOS indications to the RRC sublayer. On the contrary, if the RLM-RS quality is above the specific IS threshold, the PHY sublayer may send periodic IS indications to the RRC sublayer.

The BFR procedure includes four steps. The first step S1 is to detect beam failure. In step S1, the UE monitors reference signal associated with beam failure detection, and the beam failure occurs when a beam failure condition is met. The second step S2 is to identify a candidate beam to re-connect with the NW. In step S2, the UE monitors RS for beam identification to search for a new candidate beam. The third step S3 is to transmit a BFR request to the NW. In step S3, a BFR request is transmitted to a gNB on physical uplink control channel (PUCCH) resource(s) or random access channel (RACH) resource(s); both channel resources are associated with a plurality of candidate beams that the UE can detect; the candidate beams detectable by the UE may be defined by a pre-configured threshold, a pre-configured rules or being left for UE decision. The forth step S4 is to monitor gNB response to the BFR request. In step S4, the UE monitors a control channel search space for receiving gNB response for BFR, and determines whether the beam recovery is successful or not according to the received gNB response. For BFR request transmission on the RACH resource(s), the UE would wait a corresponding random access response (RAR) for a RA window; if the media access control (MAC) sublayer of the UE receives the RAR in response of the BFR request within the RA window, the MAC sublayer would send a beam recovery success indication to the PHY sublayer and the PHY sublayer would inform the RRC sublayer about the beam recovery success. Otherwise, the MAC sublayer would send a beam recovery failure indication to the PHY sublayer and the PHY sublayer would inform the RRC sublayer about the beam recovery failure. In another embodiment, if the MAC sublayer of the UE receives the RAR in response of the BFR request within the RA window, the MAC sublayer would send a beam recovery success indication to the RRC sublayer. Otherwise, the MAC sublayer would send a beam recovery failure indication to the RRC sublayer. For BFR request transmission on PUCCH resource(s), the UE PHY sublayer would wait L1 signaling from the gNB as the gNB response for a period; if receiving the L1 signaling within the period, the PHY sublayer determines the beam recovery is successful and would send a beam recovery success indication to the upper sublayer; otherwise, the PHY sublayer determines the beam recovery fails and would send a beam recovery failure indication to the upper sublayer. The duration of the period for waiting the gNB response may be defined by a per-configured threshold, pre-defined rules or being left for the UE decision.

In FIG. 1, suppose serving beam(s) of an UE in the connected state are identified by SS block index #1 and #2, which both are the indicated RLM-RS resources. When the beam quality of SS-block #1 and #2 becomes bad, the PHY sublayer may start to send periodic OOS indication(s) to the RRC sublayer. At the same time, a BFR procedure may be performed. A new beam identified by SS-block index #3 may be selected as a candidate beam for beam recovery at S2. The UE may perform the BFR request transmission on the PUCCH resource(s) or RACH resource(s) associated with the new beam of SS-block index #3 at S3. The UE may receive the gNB response for the new beam of SS-block index #3. The PHY sublayer may start to monitor the beam quality of SS-block index #3 together with SS-block index #1 and #2 after S4 (i.e., the gNB response for the new beam of SS-block index #3 is received). If the beam quality of any of the SS-block index #1, #2 or #3 is measured above a threshold value, the PHY sublayer may send periodic IS indication(s) to the RRC sublayer. If the beam quality of any of the SS-block index #1, #2 or #3 is measured below a threshold value, the PHY sublayer may send periodic OOS indication(s) to the RRC sublayer. The MAC sublayer may inform the gNB response for the new beam of SS-block index #3 to the PHY sublayer, e.g., the BFR request transmission is performed on RACH resource(s).

Figure 2:
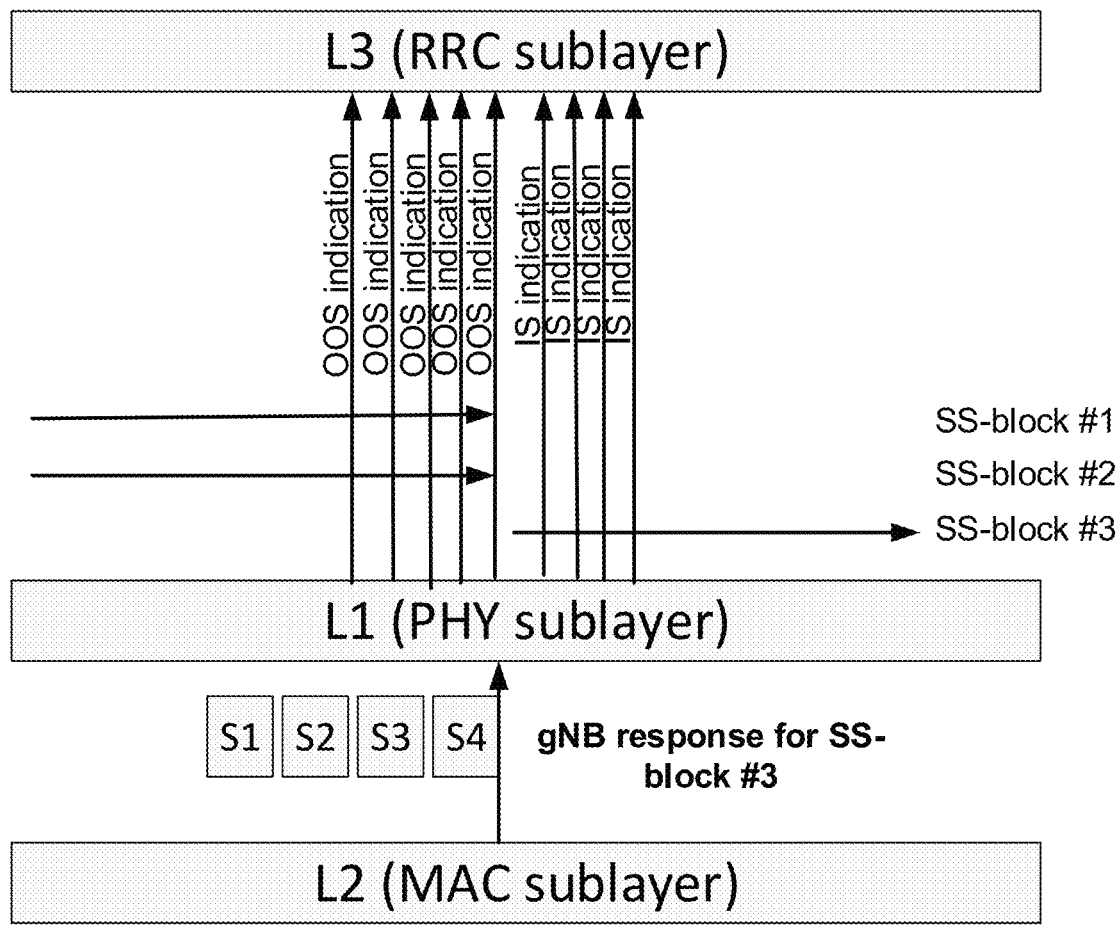
FIG. 2 is a schematic diagram illustrating a radio link monitoring procedure during radio link recovery according to another embodiment of the present application.

In FIG. 2, suppose serving beam(s) of an UE in the connected state are identified by SS-block index #1 and #2, which both are the indicated RLM-RS resources. When the beam quality of SS-block #1 and #2 becomes bad, the PHY sublayer may start to send periodic OOS indication(s) to the RRC sublayer. At the same time, a BFR procedure may be performed. A new beam identified by SS-block index #3 may be selected as a candidate beam for beam recovery at S2. The UE may perform the BFR request transmission on the PUCCH resource(s) or RACH resource(s) associated with the new beam of SS-block index #3 at S3. The UE may receive the gNB response for the new beam of SS-block index #3. The PHY sublayer may start to monitor the beam quality of SS-block index #3 only and release SS-block index #1 and #2 after S4 (i.e., the gNB response for the new beam of SS-block index #3 is received). If the beam quality of SS-block index #3 is measured above a threshold value, the PHY sublayer may send periodic IS indication(s) to the RRC sublayer. If the beam quality of SS-block index #3 is measured below a threshold value, the PHY sublayer may send periodic OOS indication(s) to the RRC sublayer. The MAC sublayer may inform the gNB response for the new beam of SS-block index #3 to the PHY sublayer, e.g., the BFR request transmission is performed on RACH resource(s).

In one embodiment, whether the UE keeps monitoring previous RLM-RS resources (e.g., SS-block #1 or #2) after receiving the gNB response depends on the UE configuration by the NW. For an UE of slow mobility, the NW may configure the UE to keep monitor the RS(s) (e.g., SS-block #1 and #2) associated with the serving beam(s) after receiving the gNB response. For an UE of high mobility, the NW may configure the UE to only monitor the new RS(s), ignoring the RS(s) associated with the serving beam(s), after receiving the gNB response.

In one embodiment, the UE may be pre-configured to maintain the RLM-RS(s) for RLM. The UE may be pre-configured to keep the SS-block(s) associated with the serving beams for RLM all the time. After receiving the gNB response to indicate a new RS associated with a candidate beam, the UE may add the new RS for RLM. The CSI-RS(s) associated with the serving beams may be ignored after receiving the gNB response to indicate a new RS for RLM. Alternatively, if the quality of the candidate beam (e.g., SS-block #3) becomes bad such that the RRC sublayer cannot receive enough consecutive IS indications, the UE may turn to monitor the previous RLM-RS(s) (e.g., SS-block #1 or #2) associated with previously serving beams.

In one embodiment, the UE may have to consolidate all of beam qualities to determine an overall cell quality by which OSS/IS condition is evaluated. In other words, every beam may be configured with an RLM-RS, and the UE may monitor all the beams to measure which cell can be a candidate cell. When the timer for radio link recovery expires, the UE may stop all the beam operations (e.g., beam recovery) over the serving cell and attempt to camp on the candidate cell.

Since the RLF recovery/restoration and BFR are performed separately in different sublayers (for example, one performed in RRC sublayer, the other performed in either MAC or PHY sublayer), the RRC sublayer may not be informed, in absence of interaction mechanism between the RLF restoration and BFR, that the out of synchronization (e.g., OOS) condition will be resolved soon due to successful beam recovery in the lower sublayer. The lower sublayer could be medium access control (MAC) sublayer or physical (PHY) sublayer.

Therefore, a BRS indication may be introduced and provided to the RRC sublayer to coordinate radio link recovery between the upper sublayer and lower sublayer once the gNB response to the BFR request is received in the PHY sublayer (when transmission on PUCCH resources) or received in the MAC sublayer (when transmission on RACH resources).

Figure 3:
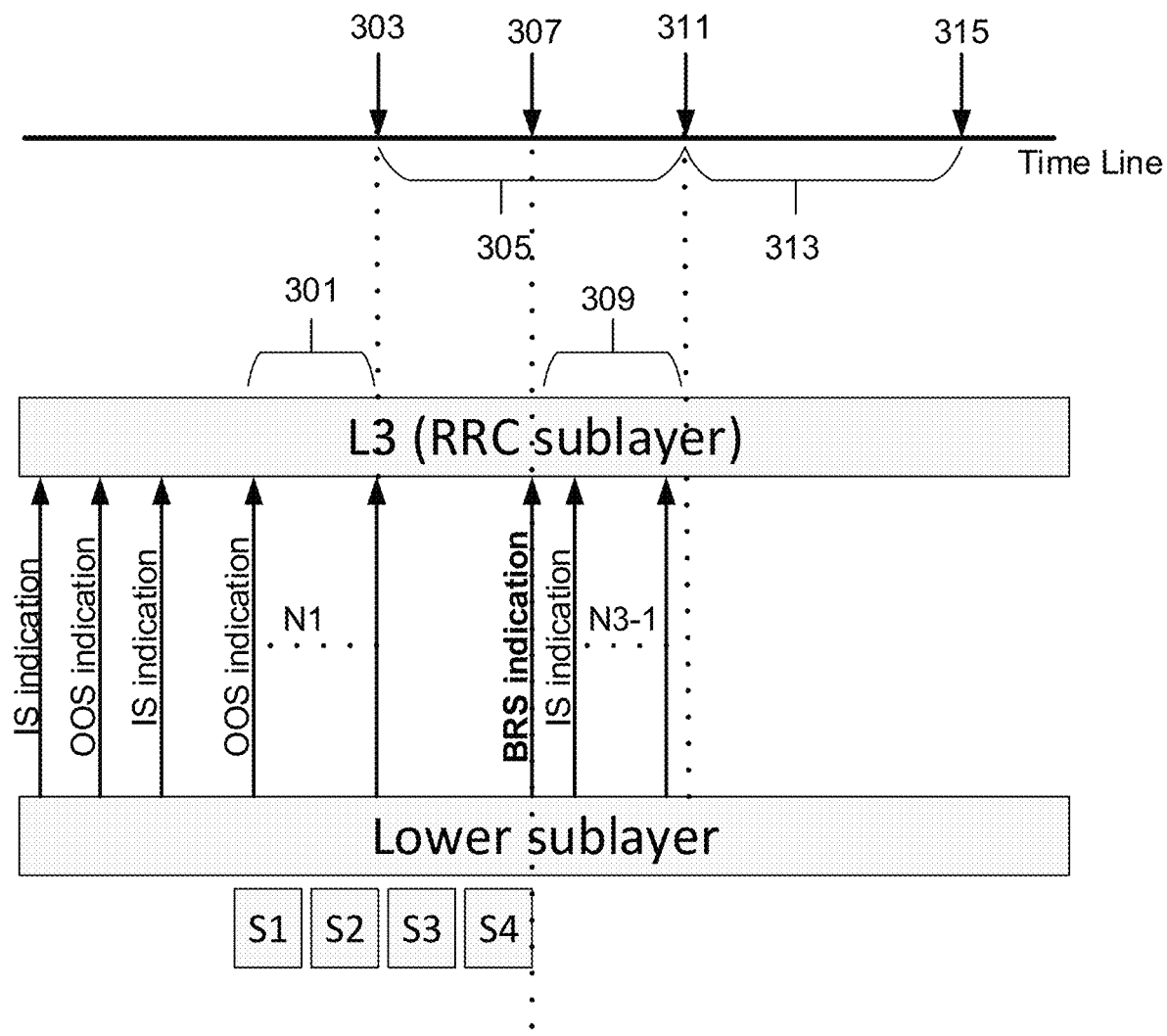
FIG. 3 is a schematic diagram illustrating an interaction between the radio link recovery and beam failure recovery according to one embodiment of the present application.

In one embodiment of the present application, the BRS indication may be counted as one of the consecutively received IS indications for radio link recovery. As shown in FIG. 3, the UE in RRC_connected state determines whether to encounter a DL radio link failure problem. In 301, the RRC sublayer consecutively receives N1 of the OOS indications from the lower sublayer, and an out-of-sync condition is detected. Then at time 303, a timer T1 for a time duration allocated for waiting radio link recovery starts to run in the RRC sublayer. At about the same time, a beam failure recovery procedure (e.g., S1 to S4) is performed in the lower sublayer(s) to resolve beam failure problem in attempt to restore the radio link quickly. After the timer T1 starts, the RRC sublayer waits to receive IS indications to restore the radio link in 305.

When the lower sublayer(s) determine a successful beam recovery, e.g., receiving the gNB response, the lower sublayer(s) may generate and send a BRS indication to the RRC sublayer at time 307. Upon receiving the BRS indication, the RRC sublayer may suspend the timer T1 at time 307 immediately and meanwhile wait to consecutively receive a number of periodic IS indications sent from the lower sublayer(s) in 309. A threshold number of the consecutive IS indications that should be received by the RRC sublayer for radio link restoration (e.g., resolved OOS condition) may be configurable. In the RRC sublayer, the number of the consecutively received IS indications may be compared with the threshold number to determine whether the OOS condition is resolved. The radio link recovery may be identified based on the comparison.

In one embodiment, the BRS indication may be counted as one of the consecutively received IS indications. In other words, the number of the consecutively received IS indications, which the UE should receive for leaving the radio link failure, may be reduced by one if the BRS indication is taken as one of the IS Indications.

In 309, the RRC sublayer determines to consecutively receive N3-1 of the IS indications to leave radio link failure condition. The number of the consecutively received IS indications has been reduced by one to N3-1 because the BRS indication is taken as one of the IS indications as long as the number of the IS indication plus the BRS indication reaches the threshold number. If N3-1 of the periodic IS indications are received consecutively, the RRC sublayer may consider radio link is recovered. On the other hand, the timer T1 would re-start to run until it expires if N4 of the OOS indications are received after receiving the BRS indication in 309. At time 311, the re-started timer T1 may expire if the OOS condition is still not resolved, and another timer T2 starts to run for a time period during which a RRC connection re-establishment is initiated. In 313, the RRC sublayer would attempt to re-establish the RRC connection with the NW. If the RRC connection re-establishment does not work until the timer T2 expires at time 315, the UE may enter a RRC_idle state. The numbers N1, N2, N3, and N4 and the duration of the timers T1 and T2 may be configured by the NW, for example, via RRC messages or system information (SI) broadcasting (e.g., minimum SI). The number N1 and N4 may be configured with the same value. The number N2 and N3 may be configured with the same value.

Figure 4:
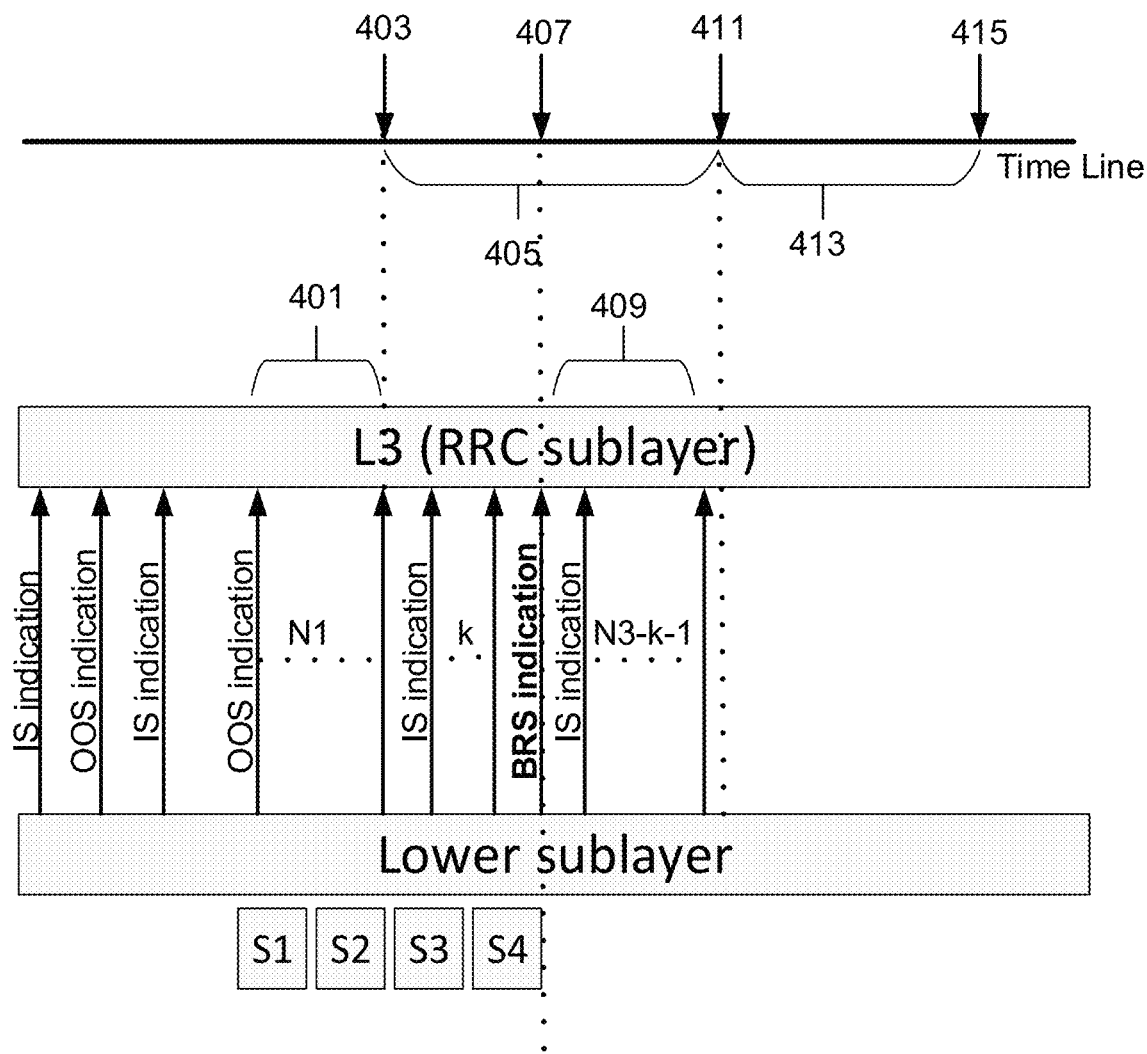
FIG. 4 is a schematic diagram illustrating an interaction between the radio link recovery and beam failure recovery according to one embodiment of the present application.

In one embodiment of the present application, the IS indications received prior to the BRS indication reception may be also considered to determine whether the RLF condition is resolved. As shown in FIG. 4, the OOS condition is declared when the RRC sublayer consecutively receives N1 of the OOS indications from the lower sublayer(s) in 401. At time 403, the timer T1 starts to run for a time period 405 allocated to perform radio link recovery. At about the same time, a beam failure recovery procedure (e.g., S1 to S4) is performed in the lower sublayer(s) to resolve beam failure problem in attempt to restore the radio link quickly. After the timer T1 starts, the RRC sublayer waits to receive IS indications to restore the radio link in 405.

In 405, there are k of the IS indications having been received consecutively prior to the BRS indication reception while the timer T1 runs. Upon receiving the BRS indication at time 407, the timer T1 may stop and the RRC sublayer determines to consecutively receive N3-k-1 of the IS indications. When a number of the IS indications are received in 409, the RRC sublayer may compare the number of consecutively received IS indication to N3-k-1 and consider the radio link is restored based on the comparing. Given that, the needed number of the IS indications consecutively received after BRS indication is reduced to N3-k-1 because k of IS indications and the BRS indication are all considered. One the other hand, if N4 of the OOS indications are consecutively received after the BRS indication is received in 409, the timer T1 may re-start to run until it expires at time 411. At the same time 411, another timer T2 starts to run for a time period during which a RRC connection re-establishment is initiated. In 413, the RRC sublayer would attempt to re-establish the RRC connection with the NW. If the RRC connection re-establishment does not work until the timer T2 expires at time 415, the UE may enter a RRC_idle state. The numbers N1, N2, N3, and N4 and the duration of the timers T1 and T2 may be configured by the NW, for example, via RRC messages or system information (SI) broadcasting (e.g., minimum SI). The number N1 and N4 may be configured with the same value. The number N2 and N3 may be configured with the same value.

Figure 5:
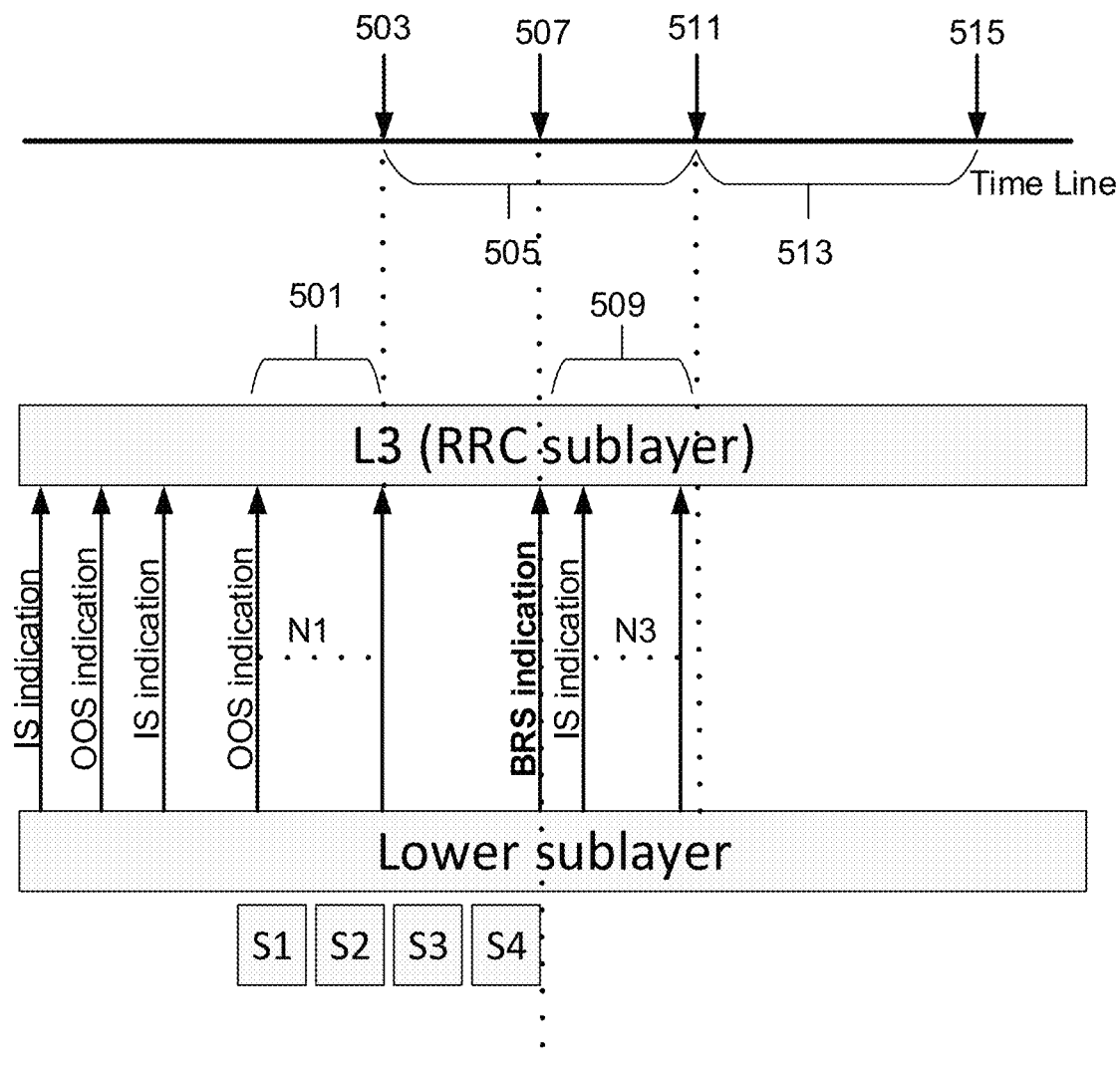
FIG. 5 is a schematic diagram illustrating an interaction between the radio link recovery and beam failure recovery according to one embodiment of the present application.

In one embodiment of the present application, the BRS indication may not be consider one of the consecutively received IS indication. As show in FIG. 5, an OOS condition is declared when the RRC sublayer receives consecutively N1 of the OOS indications in 501, and a timer T1 starts to run at time 503, followed by beam recovery procedure (e.g., S1-S4). When the lower sublayer(s) determine a successful beam recovery (e.g., receiving the gNB response), the lower sublayer(s) may generate and send a BRS indication to the RRC sublayer at time 507. Upon receiving the BRS indication, the RRC sublayer may suspend the timer T1 (for duration 505) immediately and meanwhile wait to consecutively receive a number N3 of the periodic IS indications sent from the lower sublayer in 509. Then, the number of the periodic IS indication may be compared to a threshold number. The radio link recovery is identified by the comparing. In this case, the BRS indication may not be considered one of the periodic IS indications.

When N3 of the IS indications are received consecutively from the lower sublayer, the RRC sublayer may consider radio link is recovered. On the other hand, the timer T1 would re-start to run until it expires if N4 of the OOS indications are received after receiving the BRS indication. The re-started timer T1 may expire at time 511 if the radio link failure condition is still not resolved, and at the same time 511 another timer T2 starts to run for a time period 513 during which a RRC connection re-establishment is attempted. The RRC sublayer would attempt to re-establish the RRC connection with the NW. If the RRC connection re-establishment does not work until the timer T2 expires at time 515, the UE may enter a RRC_idle state. The numbers N1, N2, N3 and N4 and the duration of the timers T1 and T2 may be configured by the NW, for example, via RRC messages or system information (SI) broadcasting (e.g., minimum SI). The number N1 and N4 may be configured with the same value. The number N2 and N3 may be configured with the same value.

Alternatively, the RRC sublayer may determine to consecutively receive a number of the IS indications to restore the radio link, in which the RRC sublayer may not consider the BRS indication but consider IS indications received prior to reception of the BRS indication in comparing the threshold number. When the lower sublayer(s) determine a successful beam recovery (e.g., receiving the gNB response), the lower sublayer(s) may generate and send a BRS indication to the RRC sublayer. Before receiving the BRS indication, the RRC sublayer may already receive consecutively k of the IS indications while the timer T1 is running. Upon receiving the BRS indication, the RRC sublayer may stop the timer T1 immediately and meanwhile wait to consecutively receive N3-k of the periodic IS indications sent from the lower sublayer(s). When N3-k of the IS indications are received consecutively after the BRS indication, the RRC sublayer may consider the radio link is recovered.

If BFR request is transmitted to the NW on the RACH resource(s), the UE would wait the corresponding RAR during a RA window. If the MAC sublayer of the UE receives the RAR within the RA window, the MAC sublayer would send the BRS indication to the PHY sublayer, and then the PHY sublayer may forward the BRS indication to the RRC sublayer. Otherwise, the MAC sublayer would send a beam recovery failure indication to the PHY sublayer. In one embodiment, the MAC sublayer may be configured to send the BRS indication directly to the RRC sublayer such that the indication delivery time can be saved without the need to forward the BRS indication by the PHY sublayer.

Figure 6:
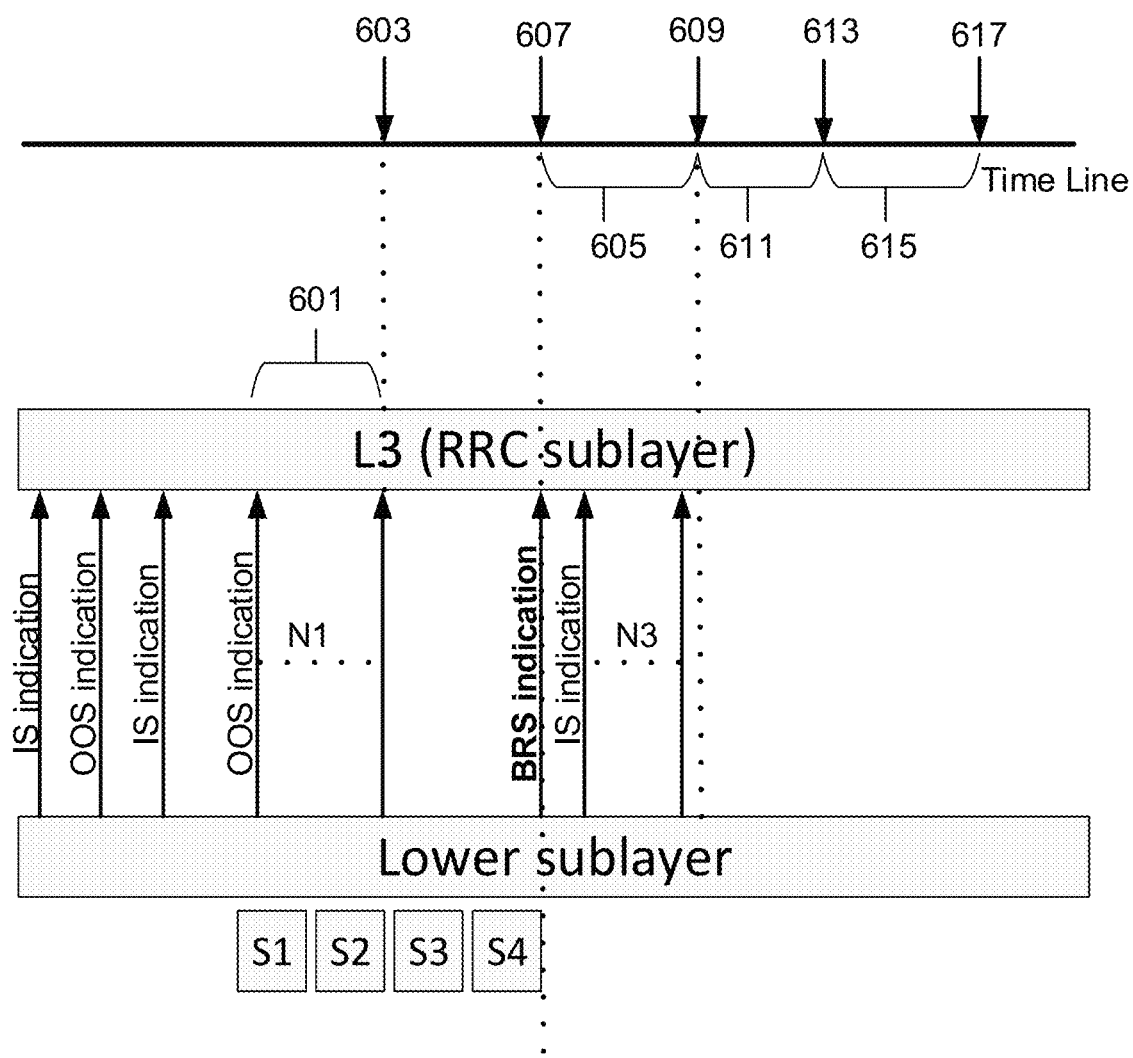
FIG. 6 is a schematic diagram illustrating an interaction between the radio link recovery and beam failure recovery according to one embodiment of the present application.

In one embodiment of the present application, a new timer T3 may be configured to receive the number of the consecutive IS indications after the timer T1 is suspended upon receiving the BRS indication. As shown in FIG. 6, upon receiving the BRS indication at time 607, the timer T1 for radio link recovery stops running and the same time a new timer T3 starts to run for receiving consecutively a number of the IS indications in 605, this number to be compared with a threshold number N3 to determine whether to leave the radio link failure condition. The timer T3 may run to expire at time 609 if the number of the consecutively received IS indication does not reach the threshold number N3; at the same time 609 the timer T1 may re-start to run for the remaining duration 611 and turn to expire at time 613. If the OOS condition is resolved before the re-started timer T1 expires, the timer T1 may stop running. In 615, the RRC sublayer may attempt to initiate the RRC connection re-establishment, and if the RRC connection re-establishment still does not work, the UE may enter the RRC_idle state at time 617. The configurations associated to the new timer T3 may be transmitted by the RRC sublayer from the NW to the UE.

In one embodiment of the present application, the RRC sublayer may not suspend or stop the timer T1 upon receiving the BRS indication but extend the timer T1 to create sufficient time period for consecutively receiving sufficient number of the periodic IS indications. The sufficient number is equal to or larger than a threshold number. When the lower sublayer(s) determine a successful beam recovery (e.g., receiving the gNB response), the lower sublayer(s) may send a BRS indication to the RRC sublayer. Upon receiving the BRS indication, the RRC sublayer may determine whether the remaining time period of the timer T1 after BRS indication is long enough to consecutively receive the number of the IS indications to reach the threshold number. If the remaining time of T1 is larger than or equal to the time required for receiving the sufficient number of the consecutive IS indications to reach the threshold number, the RRC sublayer may not suspend T1 but keep running it and receiving the IS indications during the same time. On the other hand, if the remaining time of T1 is not long enough, the RRC sublayer may extend the timer T1 to a longer time during which the number of the IS indications can be consecutively received to reach the threshold number while the extended timer T1 may still run. If the number of the IS indications to be consecutively received during the T1 extension time is equal to or larger than a threshold number, the RRC sublayer may consider the radio link is recovered. If at least one of the OOS indications is received during the time period of T1 (no matter it is extended or not), the timer T1 may expire immediately. Another timer T2 may start, upon expiration of T1, for a time period within which the RRC connection re-establishment is performed. The UE may enter the RRC_idle state when the timer T2 expires.

Figure 7:
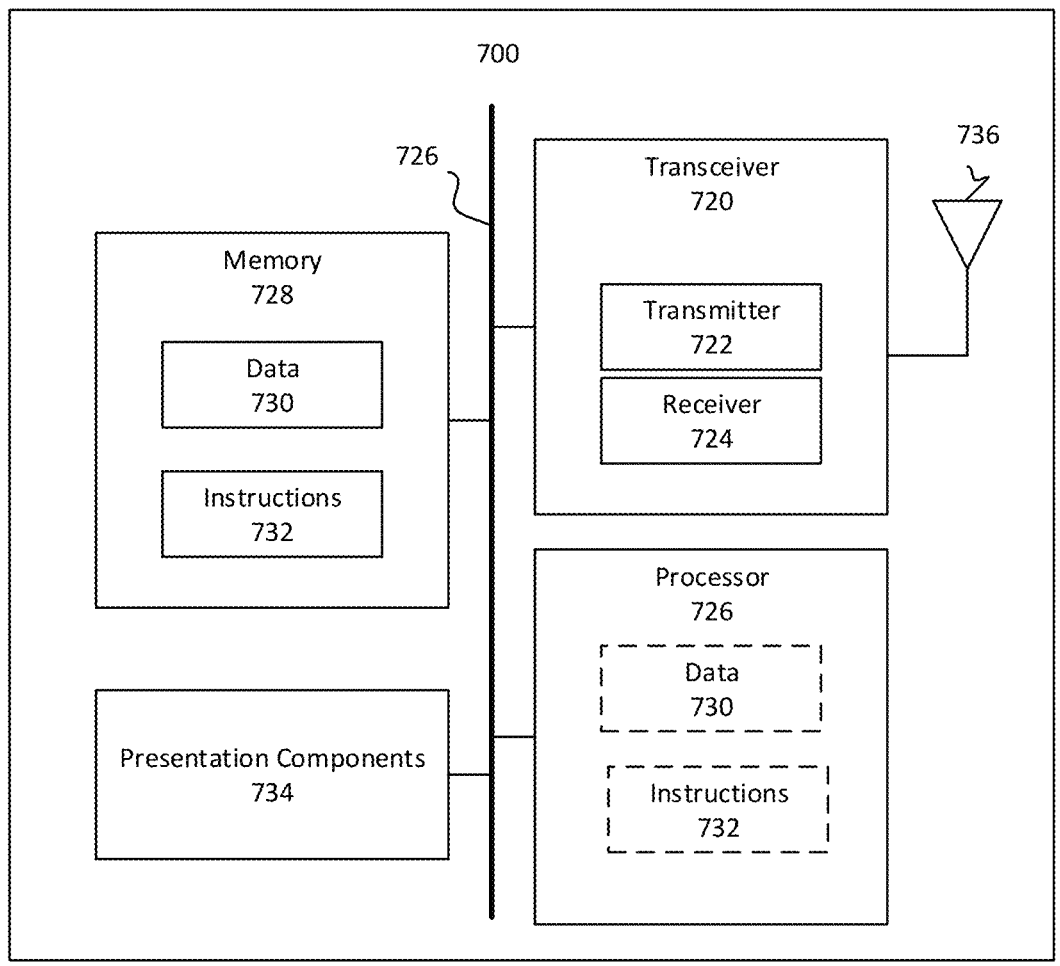
FIG. 7 is a block diagram of a device for wireless communication, according to various embodiments of the present application.

FIG. 7 illustrates a block diagram of a device for wireless communication, according to various exemplary implementations of the present disclosure. As shown in FIG. 7, device 700 may include transceiver 720, processor 726, memory 728, one or more presentation components 734, and at least one antenna 736. Device 700 may also include an RF spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 726.

Transceiver 720 having transmitter 722 and receiver 724 may be configured to transmit and/or receive time and/or frequency resource partitioning information. In some implementations, transceiver 720 may be configured to transmit in different types of subframes and slots including, but not limited to, usable, non-usable and flexibly usable subframes and slot formats. Transceiver 720 may be configured to receive data and control channels.

Device 700 may include a variety of computer-readable media. Computer-readable media can be any available media that can be accessed by device 700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 728 may include computer-storage media in the form of volatile and/or non-volatile memory. Memory 728 may be removable, non-removable, or a combination thereof. Exemplary memory includes solid-state memory, hard drives, optical-disc drives, and etc. As illustrated in FIG. 7, memory 728 may store computer-readable, computer-executable instructions 732 (e.g., software codes) that are configured to, when executed, cause processor 726 to perform various functions described herein, for example, with reference to FIG. 1 through 6. Alternatively, instructions 732 may not be directly executable by processor 726 but be configured to cause device 700 (e.g., when compiled and executed) to perform various functions described herein.

Processor 726 may include an intelligent hardware device, e.g., a central processing unit (CPU), a microcontroller, an ASIC, and etc. Processor 726 may include memory. Processor 726 may process data 730 and instructions 732 received from memory 728, and information through transceiver 720, the base band communications module, and/or the network communications module. Processor 726 may also process information to be sent to transceiver 720 for transmission through antenna 736, to the network communications module for transmission to a core network.

One or more presentation components 734 presents data indications to a person or other device. Exemplary one or more presentation components 734 include a display device, speaker, printing component, vibrating component, and etc.

From the above description it is manifest that various techniques can be used for implementing the concepts described in the present disclosure without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method for a user equipment (UE) in a wireless network, the method comprising:
   starting a first timer when an out-of-sync condition is detected;
   receiving a beam recovery success (BRS) indication indicating a beam recovery is successfully made;
   determining, in response to the BRS indication, to consecutively receive a plurality of in-sync (IS) indications;
   comparing a number of the consecutively received IS indications with a threshold number;
   identifying whether the out-of-sync condition is resolved based on the comparison;
   determining whether an amount of time remaining on the first timer after receiving the BRS indication is enough to consecutively receive sufficient IS indications of the plurality of IS indications; and
   extending the first timer in response to a determination that the amount of time remaining on the first timer is not enough.

2. The method of claim 1, wherein the threshold number is configured by the wireless network, and the out-of-sync condition is identified as resolved successfully when the number of the consecutively received IS indications is equal to or larger than the threshold number.

3. The method of claim 1, wherein the BRS indication is counted as one of the consecutively received IS indications.

4. The method of claim 1, wherein the plurality of consecutively received IS indications includes IS indications received before the BRS indication is received.

5. The method of claim 1, wherein the BRS indication is generated in a lower sublayer, the lower sublayer being a medium access control (MAC) sublayer or a physical (PHY) sublayer.

6. The method of claim 1, wherein the out-of-sync condition is detected when consecutively receiving a plurality of out-of-sync (OOS) indications.

7. The method of claim 1, further comprising:
   suspending the first timer upon receiving the BRS indication; and
   re-starting the first timer after receiving at least one out-of-sync indication.

8. The method of claim 1, further comprising:
   suspending the first timer and starting a second timer upon receiving the BRS indication;
   determining to consecutively receive the plurality of the IS indications before the second timer expires; and
   re-starting the first timer when the second timer expires.

9. The method of claim 1, further comprising:
   staring, after the first timer expires, a second timer for a time period within which a radio resource control (RRC) connection re-establishment is initiated; and
   entering an RRC idle state when the RRC connection re-establishment fails.

10. A user equipment (UE) comprising:
    a non-transitory machine-readable medium storing computer-executable instructions;
    a processor coupled to the non-transitory computer-readable medium, and configured to execute the computer-executable instructions to:
       start a first timer when an out-of-sync condition is detected;
       receive a beam recovery success (BRS) indication indicating a beam recovery is successfully made;
       determine, in response to the BRS indication, to consecutively receive a plurality of in-sync (IS) indications;
       compare a number of the consecutively received IS indications with a threshold number;
       identify whether the out-of-sync condition is resolved based on the comparison;
       determine whether an amount of time remaining on the first timer after receiving the BRS indication is enough to consecutively receive sufficient IS indications of the plurality of IS indications; and
       extend the first timer in response to a determination that the amount of time remaining on the first timer is not enough.

11. The UE of claim 10, wherein the threshold number is configured by the wireless network, and the out-of-sync condition is identified as resolved successfully when the number of the consecutively received IS indications is equal to or larger than the threshold number.

12. The US of claim 10, wherein the BRS indication is counted as one of the consecutively received IS indications.

13. The UE of claim 10, wherein the plurality of consecutively received IS indications include IS indications received before the BRS indication is received.

14. The UE of claim 10, wherein the BRS indication is generated in a lower sublayer, the lower sublayer being a medium access control (MAC) sublayer or a physical (PHY) sublayer.

15. The UE of claim 10, wherein the out-of-sync condition is detected when consecutively receiving a plurality of out-of-sync (OOS) indications.

16. The UE of claim 10, wherein the processor is further configured to execute the computer-executable instructions to:
    suspend the first timer upon receiving the BRS indication; and
    re-start the first timer after receiving at least one out-of-sync indication.

17. The UE of claim 10, wherein the processor is further configured to execute the computer-executable instructions to:
    suspend the first timer and start a second timer upon receiving the BRS indication;

determine to consecutively receive the plurality of the IS indications before the second timer expires; and re-start the first timer when the second timer expires.

18. The UE of claim 10, wherein the processor is further configured to execute the computer-executable instructions to:

start, after the first timer expires, a second timer for a time period within which a radio resource control (RRC) connection re-establishment is initiated; and enter an RRC idle state when the RRC connection re-establishment fails.

* * * * *